(12) United States Patent
Vretta

(10) Patent No.: US 6,637,360 B2
(45) Date of Patent: Oct. 28, 2003

(54) CONVERTIBLE MARINE FENDER

(76) Inventor: John Albert Vretta, 300 Henley Dr., Naples, FL (US) 34104

( * ) Notice: Subject to any disclaimer, the term of this patent is extended or adjusted under 35 U.S.C. 154(b) by 0 days.

(21) Appl. No.: 10/178,195

(22) Filed: Jun. 24, 2002

(65) Prior Publication Data

US 2003/0005873 A1 Jan. 9, 2003

Related U.S. Application Data

(60) Provisional application No. 60/303,422, filed on Jul. 6, 2001.

(51) Int. Cl.[7] .............................................. B63B 59/02
(52) U.S. Cl. ..................................................... 114/219
(58) Field of Search .................... 114/219; 405/212–219

(56) References Cited

U.S. PATENT DOCUMENTS

| | | | |
|---|---|---|---|
| 3,997,150 A | * 12/1976 | Hansen et al. | ............... 114/219 |
| 4,924,796 A | 5/1990 | Duffy | |
| 5,018,471 A | 5/1991 | Stevens | |
| 5,497,723 A | * 3/1996 | Chase | ........................ 114/219 |
| 5,562,364 A | 10/1996 | Darder-Alomar | |
| 5,628,270 A | 5/1997 | Ryll | |
| 5,937,781 A | 8/1999 | Isella | |
| D452,466 S | 12/2001 | Skulnick | |

* cited by examiner

Primary Examiner—Ed Swinehart
(74) Attorney, Agent, or Firm—Porter, Wright, Morris & Arthur, LLP

(57) ABSTRACT

A convertible marine fender includes a half-cylinder shaped first body having a inner surface, a half-cylinder shaped second body having a inner surface, and a hinge pivotably connecting the first and second bodies. The first body is pivotable lengthwise between a first position wherein the inner surfaces of the bodies are facing each other so that the first and second bodies cooperate to form a cylindrical-shape and a second position wherein the inner surfaces of the bodies are facing in the same direction and generally coplanar so that the first and second bodies form a half-cylinder-shape. A connecting strap preferably extends circumferentially around the first and second bodies and releasably secures the first and second bodies together when the first body is in the first position. The hinge is preferably a planar member formed of a flexible material.

19 Claims, 11 Drawing Sheets

CONVERTIBLE MARINE FENDER

CROSS-REFERENCE TO RELATED APPLICATIONS

The application claims the benefit of U.S. Provisional Patent Application No. 60/303,422 filed on Jul. 6, 2001.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a marine fender and, more particularly, to a marine fender which is convertible between a cylindrical boat fender and a temporary dock fender.

BACKGROUND OF THE INVENTION

Marine fenders are typically used to provide a cushion between a boat hull and a dock or another boat to which the boat is tied. One type of marine fender is a cylindrically-shaped boat fender which is typically tied to a railing or cleat of the boat hull. Pneumatic boat fenders are often favored because of their inherent resiliency and adjustability. See U.S. Pat. No. 4,924,796 for an example of a known cylindrical, pneumatic boat fender, the disclosure of which are expressly incorporated herein in its entirety. Another type of marine fender is a dock fender which is secured to the dock to cushion against an approaching boat hull. See U.S. Pat. Nos. 5,937,781, 5,562,364, and 5,018,471 for examples of such dock fenders, the disclosures of which are expressly incorporated herein in their entirety. While these various marine fenders are somewhat effective in protecting boat halls, it can be burdensome to have every type of marine fender and to find storage space for each of them on the boat.

One approach to solving this problem was a modular marine fender system having one or more hinged marine fender units which can be attached to either the boat or the dock. See U.S. Pat. No. 5,628,270, the disclosure of which are expressly incorporated herein in its entirety. While this modular system professes to be effective as both a boat fender and a dock fender, it is very difficult and time consuming to be used both as a boat fender and as a dock fender because of the manner in which it must be secured. Accordingly, there is a need in the art for an improved marine fender which can operate as both a traditional boat fender and a temporary dock fender.

SUMMARY OF THE INVENTION

The present invention provides a convertible fender including a resilient, elongate first body having a length, a width and a thickness and a resilient, elongate second body having a length, a width and a thickness. The length of the first body is greater than the width of the first body and greater than the thickness of the first body. The length of the second body is greater than the width of the second body and greater than the thickness of the second body. A hinge connects the first and second bodies such that the first body is pivotable lengthwise relative to the second body.

According to another aspect of the present invention, a convertible fender includes a resilient first body which is generally half-cylinder shaped having a generally planer first inner surface and a resilient second body which is generally half-cylinder shaped having a generally planar second inner surface. A hinge connects the first and second bodies such that the first body is pivotable between a first position and a second position. In the first position, the first inner surface is facing and engaging the second inner surface so that the first and second bodies cooperate to form a cylindrical-shape. In the second position, the first inner surface is facing in the same direction as the second inner surface and generally coplanar with the second inner surface so that the first and second bodies form a half-cylinder-shape.

According to yet another aspect of the present invention, a convertible fender includes a resilient first body having a generally planer first inner surface with a first channel formed therein and a resilient second body having a generally planar second inner surface with a second channel formed therein. A hinge connects the first and second bodies such that the first body is pivotable between a first position and a second position. In the first position, the first inner surface is facing the second inner surface and the first channel is facing the second channel. In the second position, the first inner surface is facing in the same direction as the second inner surface and the first channel is facing in the same direction as the second channel.

From the foregoing disclosure and the following more detailed description of various preferred embodiments it will be apparent to those skilled in the art that the present invention provides a significant advance in the technology of marine fender construction. Particularly significant in this regard is the potential the invention affords for providing a high quality, reliable, convertible, easily mounted and dismounted fender. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
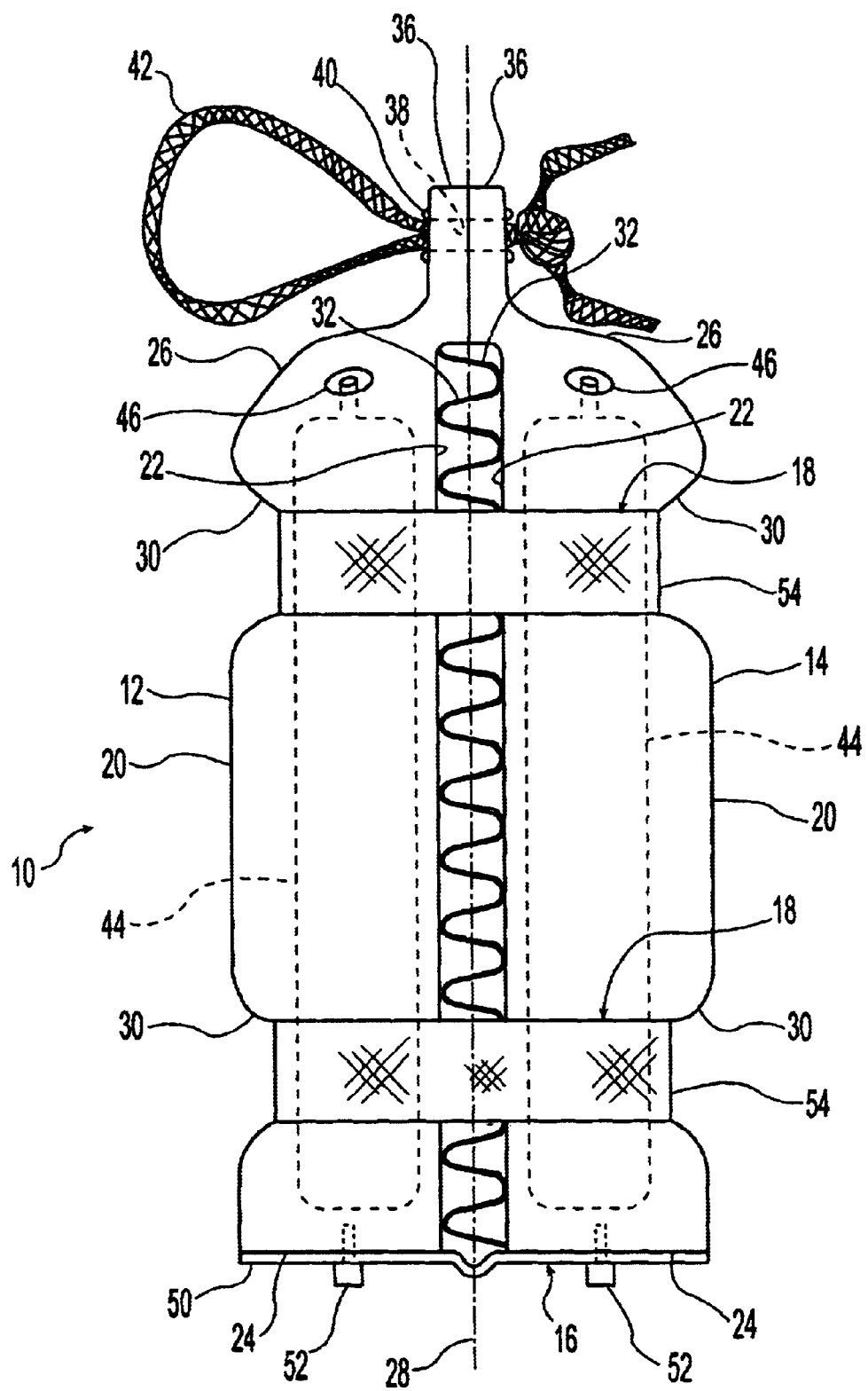
FIG. 1 is a side elevational view of a convertible marine fender according to the present invention wherein the marine fender is in a retracted or boat fender configuration.

It should be understood that the appended drawings are not necessarily to scale, presenting a somewhat simplified representation of various preferred features illustrative of the basic principles of the invention. The specific design features of the convertible marine fender as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the convertible marine fender illustrated in the drawings. In general, up or upward refers to an upward direction within the plane of the paper in FIG. 1 and down or downward refers to a downward direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved fender construction disclosed herein. The following detailed discussion of various alternative and preferred embodiments will illustrate the general principles of the invention with reference to a convertible marine fender for use with both a boat and a dock. Other embodiments suitable for other applications will be apparent to those skilled in the art given the benefit of this disclosure.

Figure 2:
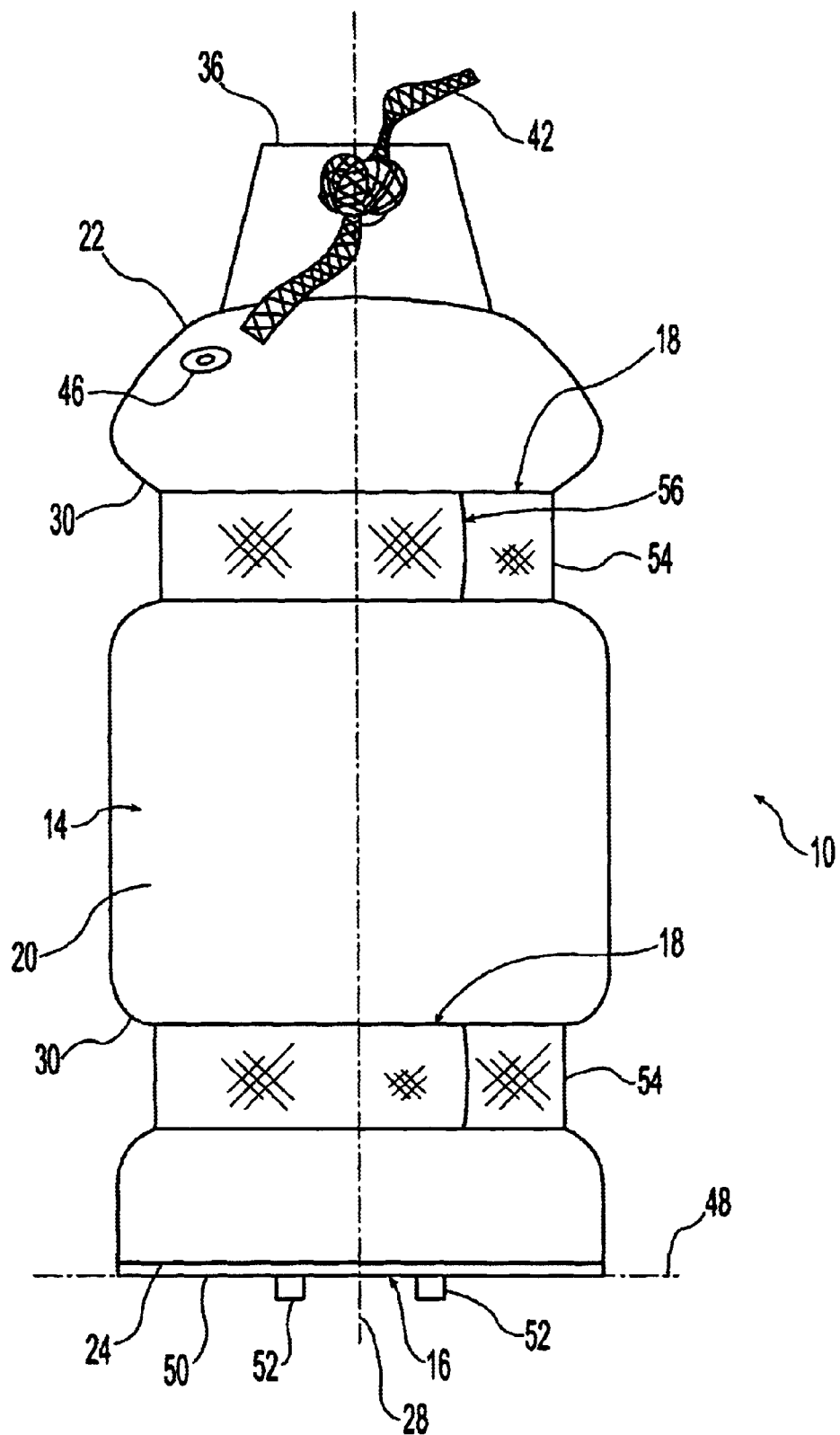
FIG. 2 is front elevation view of the convertible marine fender of FIG. 1.
Figure 3:
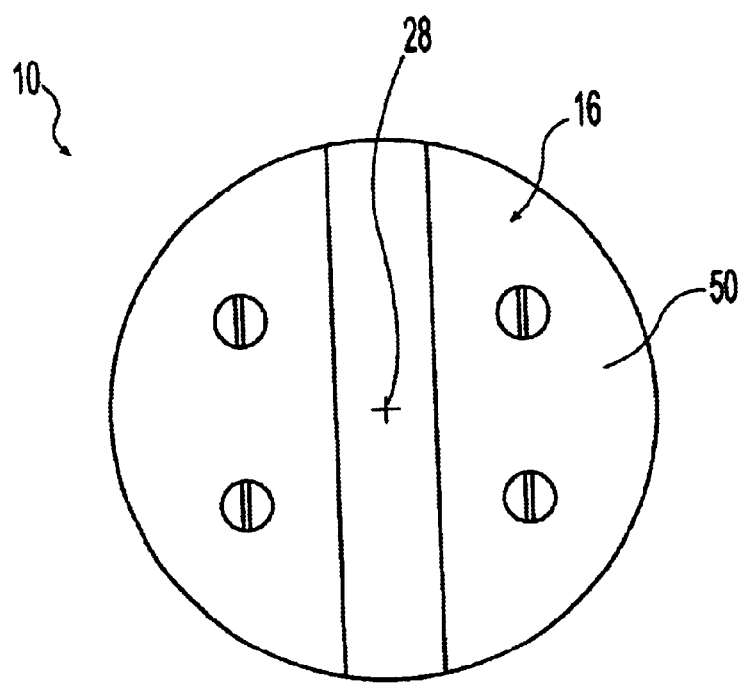
FIG. 3 is bottom plan view of the convertible marine fender of FIGS. 1 and 2.
Figure 4:
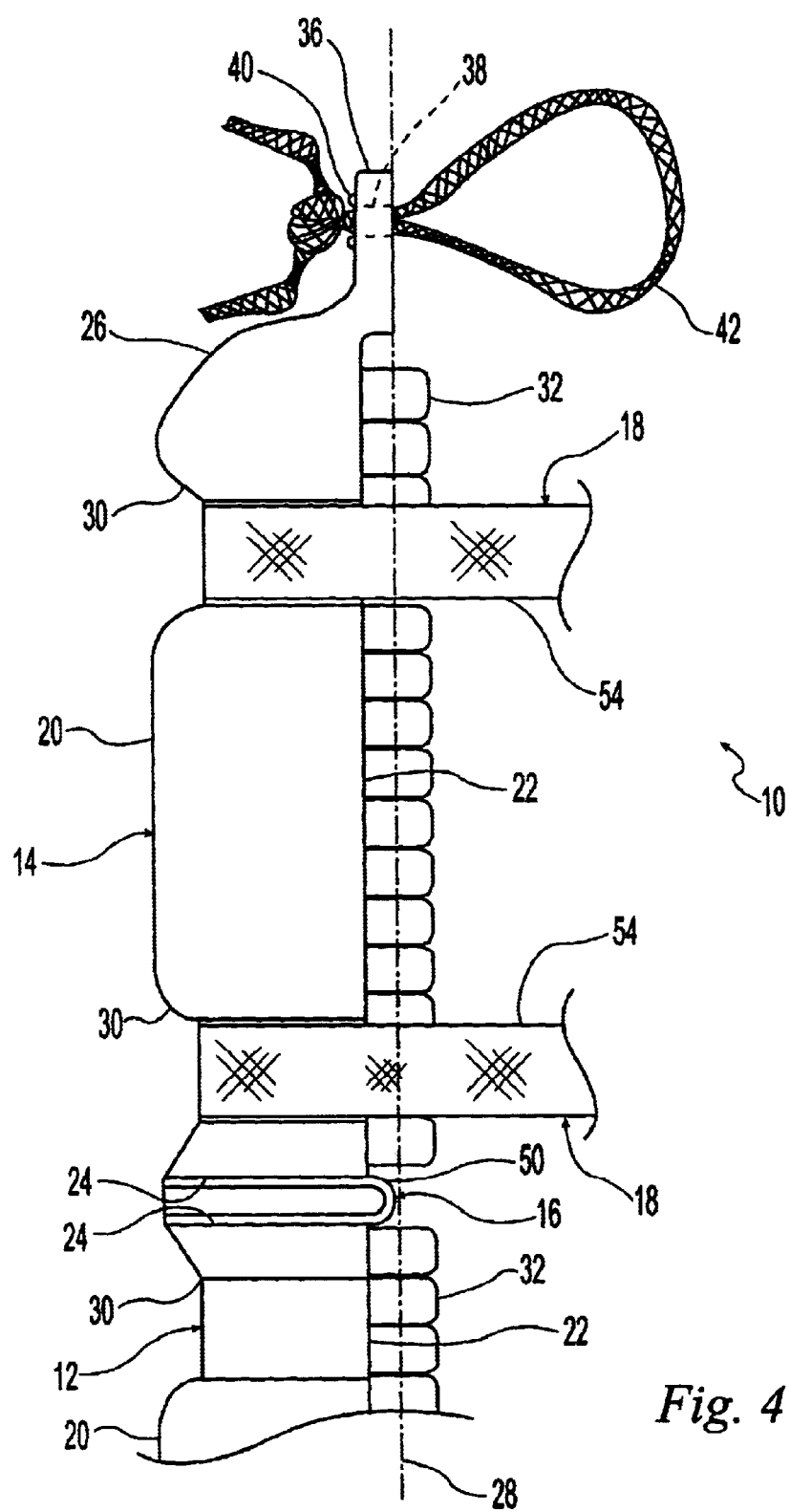
FIG. 4 is a side elevational view of the convertible marine fender of FIGS. 1 to 3 but wherein the marine fender is in an extended or dock fender configuration.
Figure 5:
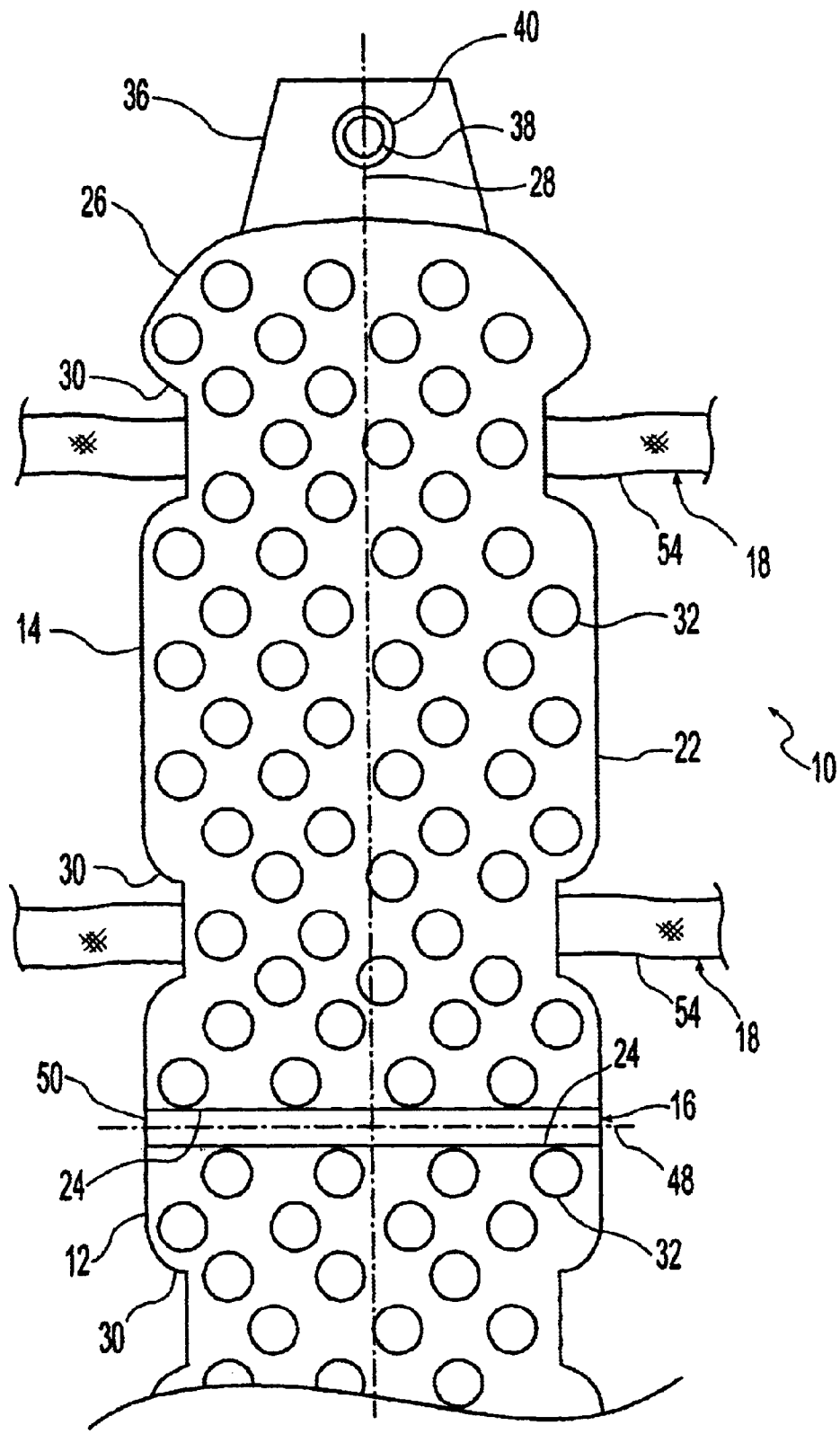
FIG. 5 is a front elevation view of the convertible marine fender of FIG. 4.

Referring now to the drawings, FIGS. 1–5 show a convertible marine fender 10 according to the present invention which is convertible between a retracted or boat configuration (shown in FIGS. 1 to 3) and an extended or dock configuration (shown in FIGS. 4 and 5). The fender 10 includes first and second bodies 12, 14, a hinge 16 connecting the first and second bodies 12, 14, and connectors 18 for releasably securing the first and second bodies 12, 14 together when in the retracted configuration and/or to a dock when in the extended configuration.

The first and second bodies 12, 14 cooperate to generally form a cylindrical shape when in the retracted configuration and a half-cylinder-shape when in the extended configuration which is generally twice as long as the cylinder shape. Because the first and second bodies 12, 14 are substantially identical, only the first body 12 will be described in detail hereinafter. The illustrated first body 12 is elongate and generally shaped in the form of a half-cylinder having a curved or round outer surface 20, a generally flat planar inner or contact surface 22 and opposite the outer surface 20, a substantially flat or planar bottom surface 24, and a generally arcuate or curved upper surface 26. The first body 12 has a length in the direction of a longitudinal axis 28 of the cylinder formed by the first and second bodies 12, 14, a thickness in the direction substantially perpendicular to the inner surface 22 and the longitudinal axis 28, and a width in the direction substantially parallel to the inner surface 22 and substantially perpendicular to the longitudinal axis 28. The thickness is preferably equal to a radius of curvature of the outer surface 20 so that the combined thickness of the first and second bodies 12, 14 forms the diameter of the cylinder formed by the first and second bodies 12, 14. The width is preferably greater than the thickness and more preferably equal to about twice the thickness in that the width forms the diameter of the cylinder formed by the first and second bodies 12, 14. The length is preferably greater than the width and more preferably greater than at least twice the width. It is noted that while the illustrated first body 12 is a half cylinder which forms a cylinder with the second body 14, the first and second bodies 12, 14 can alternatively have other shapes within the scope of the present invention such as, for example, the first and/or second bodies 12, 14 could be rectangular shaped.

The outer surface 20 is preferably provided with a pair of circumferentially-extending grooves 30 which are spaced apart along the length of the first body 12. The grooves 30 are sized and shaped to receive the connectors 18 therein as discussed in more detail hereinafter. It is noted that other quantities, sizes and forms of the grooves 30 can be utilized within the scope of the present invention.

The inner surface 22 preferably includes a plurality of spaced apart protrusions or nipples 32 which extend substantially perpendicular to the inner surface 22. The protrusions 32 of the first body 12 are sized and shaped to cooperate with the projections 32 of the second body 14 to interlock the first and second bodies 12, 14 together when the fender 10 is in the retracted configuration and to provide an improved non-skid property to the inner surface 22 when the fender 10 is in the extended configuration. The protrusions 32 of the first body 12 are preferably at different locations than the protrusions 32 of the second body 14 so that the first and second bodies 12, 14 nest together when in the retracted configuration. Alternatively, the protrusions 32 of the first and second bodies 12, 14 can be at identical locations so that they face and/or engage one another when in the retracted configuration. The illustrated protrusions 32 are generally circular in cross section and are generally rounded or curved at their free ends to aid in the nesting of the first and second bodies 12, 14. It is noted that the protrusions 32 can alternatively be of other suitable quantities, locations, sizes, forms within the scope of the present invention. It is also noted that the first and second bodies 12, 14 can alternatively be provided with other suitable means for interlocking the bodies 12, 14 together and/or other suitable means for providing non-skid properties to the inner surface 22 within the scope of the present. It is further noted that alternatively the first and second bodies 12, 14 can be provided with no means for interlocking the bodies 12, 14 together and/or no means for providing nonskid properties to the inner surface 22 within the scope of the present.

The upper surface 26 extends to a flange 36 at the inner surface 22. The flange 36 preferably extends to the midpoint of the protrusions 32 so that it engages the flange 36 of the second body 14 when the fender 10 is in the retracted configuration. The flange 36 has an opening 38 provided therein. Preferably, the opening 38 is provided with an eyelet 40. The illustrated opening 38 is sized and shaped for receiving a handle 42 therethrough. The handle 42 can be of any suitable type such as a loop handle formed by a flexible, elongate member such as a rope or cord.

The illustrated first and second bodies 12, 14 are preferably formed of a resilient material such as, for example, marine grade vinyl or other suitable materials. The first and second bodies 12, 14 are preferably manufactured by a molding process such as, for example, injection molding or other suitable molding processes.

The illustrated first and second bodies 12, 14 form a pneumatic fender and are each provided with a sealed interior cavity or bladder 44 therein and a valve 46 extending from the cavity 44 to the exterior of the first and second bodies 12, 14. The cavities 44 and the valves 46 are adapted so that air, or other suitable fluid, can be inserted and removed from the cavities 44 to selectively adjust inflation, and thus the resiliency, of the first and second bodies 12, 14. It is noted that the first and second bodies 12, 14 can alternatively be non-pneumatic having a solid, foam, and/or non-pneumatic cavity construction within the scope of the present invention.

The hinge 16 is secured to each of the first and second bodies 12, 14 to connect the first and second bodies 12, 14 together so that the first and second bodies 12, 14 can be pivoted about the inner edge of the bottom surfaces 24 between the retracted position, wherein the inner surfaces 22 are facing each with the first and second bodies 12, 14 cooperating to form a cylinder, and the extended position, wherein the inner surfaces 22 are facing in the same direction and located one above the other with the first and second bodies 12,14 cooperating to form a relatively longer half-cylinder. The hinge 16 forms a laterally extending pivot axis 48 which is substantially perpendicular to the longitudinal axis 28 and substantially parallel to the inner surfaces 22. The pivot axis 48 is preferably located at or near the intersection of the inner and bottom surfaces 22, 24 of each the first and second bodies 12, 14.

The hinge 16 is preferably a generally planar member or sheet 50 formed of a flexible material. It is noted, however, that other suitable types of hinges 16 can be utilized within the scope of the present invention. The planar member 50 can be formed of any suitable flexible material such as, for example, marine grade vinyl or other suitable flexible materials. The material is preferably resilient to bias the first and second members 12, 14 toward the retracted configuration. The planar member 50 typically has a thickness in the range of about 0.25 inches to about 0.38 inches but can be larger or smaller depending on the size of the fender, the material chosen, and the properties desired. It is noted that while the illustrated embodiment utilizes a single planar member 50, the hinge 16 can include two or more planar members or straps of flexible material.

The planar member 50 is rigidly secured to each of the first and second members 12, 14 at the bottom surfaces 24. The planar member 50 is preferably secured to the first and second members 12, 15 by nylon screws 52. The illustrated embodiment has two screws 52 extending into each of the first and second bodies 12, 14. The first and second bodies preferably have holes or openings molded therein for receiving the screws 52. The planar member 50 can be easily replaced when mounted in this manner. It is noted that the planar member 50 can be alternatively secured to the first and second bodies 12, 14 by any other suitable means such as, for example, adhesives or other mechanical fasteners. It is also noted that the planar member 50 alternatively can be unitarily molded with the bodies 12, 14 or co-molded with or over-molded to the bodies 12, 14.

The illustrated connectors 18 are connecting straps 54 which are elongate flexible members sized and shaped for extending about the circumference of the first and second members 12, 14 when the fender 10 is in the retracted configuration. The connecting straps 54 are adapted to secure the bodies 12, 14 together when the fender 10 is in the retracted configuration to retain the fender 10 in the retracted configuration. The connecting straps 54 are also adapted to secure the fender 10 to a dock when in the extended configuration as described in more detail hereinafter. It is noted that the connectors 18 can alternatively be of any other suitable type such as, for example, latches, ties, ropes or cords and connectors can be separately provided for the needs of the retracted and extended configurations.

Figure 6:
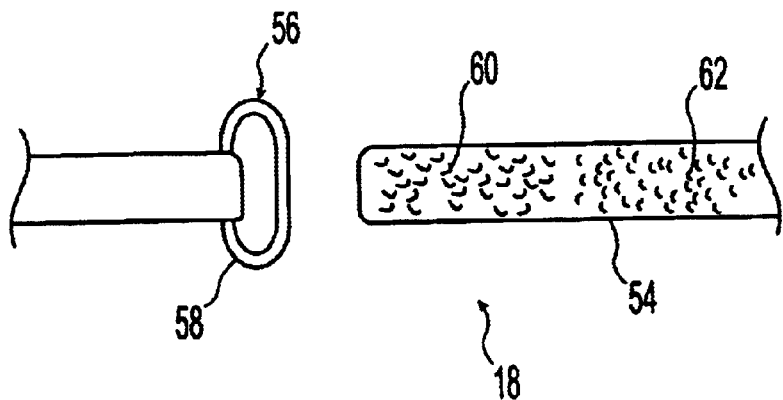
FIG. 6 is a diagrammatic view of ends of a connector strap of the convertible marine fender of FIGS. 1–5.
Figure 7:
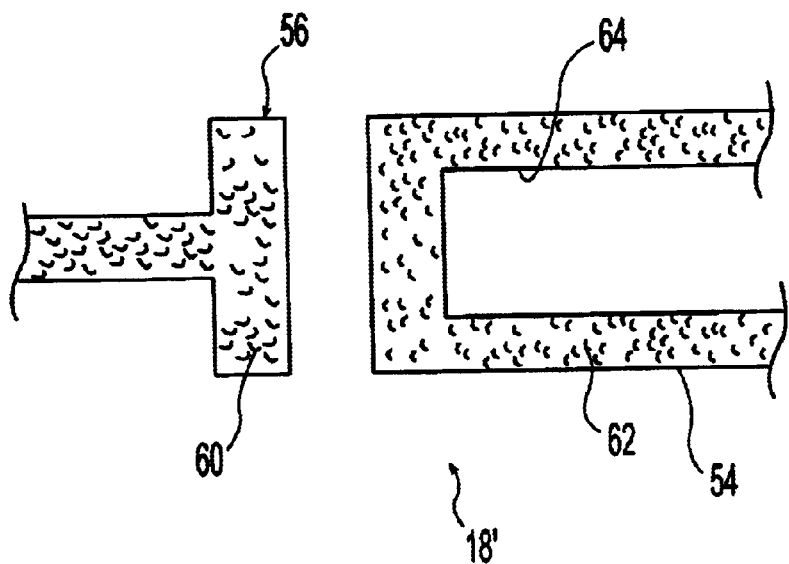
FIG. 7 is a diagrammatic view of ends of an alternative connector strap of the convertible marine fender of FIGS. 1–5.

The connecting straps 54 extend within the grooves 30 to encircle the first and second bodies 12, 14 when in the retracted configuration and are secured at their ends to hold the first and second bodies 12, 14 together. The ends of the connecting straps 18 are preferably provided with means 56 for releasably securing the ends of the connecting straps 54 together with the first and second bodies 12, 14 firmly held together. As best shown in FIG. 6, one end of the connecting strap 54 is preferably provided with a loop 58 while the other end is provided with a hook and loop fasteners 60, 62 such as, for example, VELCRO. It is noted that other releasable securing means 56 can be utilized within the scope of the present invention such as, for example, other configurations of hook and loop fasteners, buckles, snaps, hooks, ties or the like. For example, FIG. 7 illustrates an alternative connecting strap 34' wherein one end is generally T-shaped while the other end has an opening 64 sized for receiving the T-shaped end therein. The ends are provided with hook and loop fasteners 60, 62 such as, for example, VELCRO. The connecting straps 34 are preferably secured to one of the first and second bodies 12, 14 (the second body 14 in the illustrated embodiment) such as by hook and loop fasteners, adhesives, or mechanical fasteners.

As best shown in FIGS. 1 to 3, the inner surfaces 22 of the first and second bodies 12, 14 face and engage each other when in the retracted configuration so that the first and second bodies 12, 14 cooperate to form a cylindrical shape. The protrusions 32 are interlocked to aid in retaining the first and second bodies 12, 14 together. The connecting straps 34 are within the grooves 30 and are pulled tight and secured to firmly hold the first and second bodies 12, 14 together. The handle 42 extends through the openings 38 in the flanges 36 of both the first and second bodies 12, 14.

Figure 8:
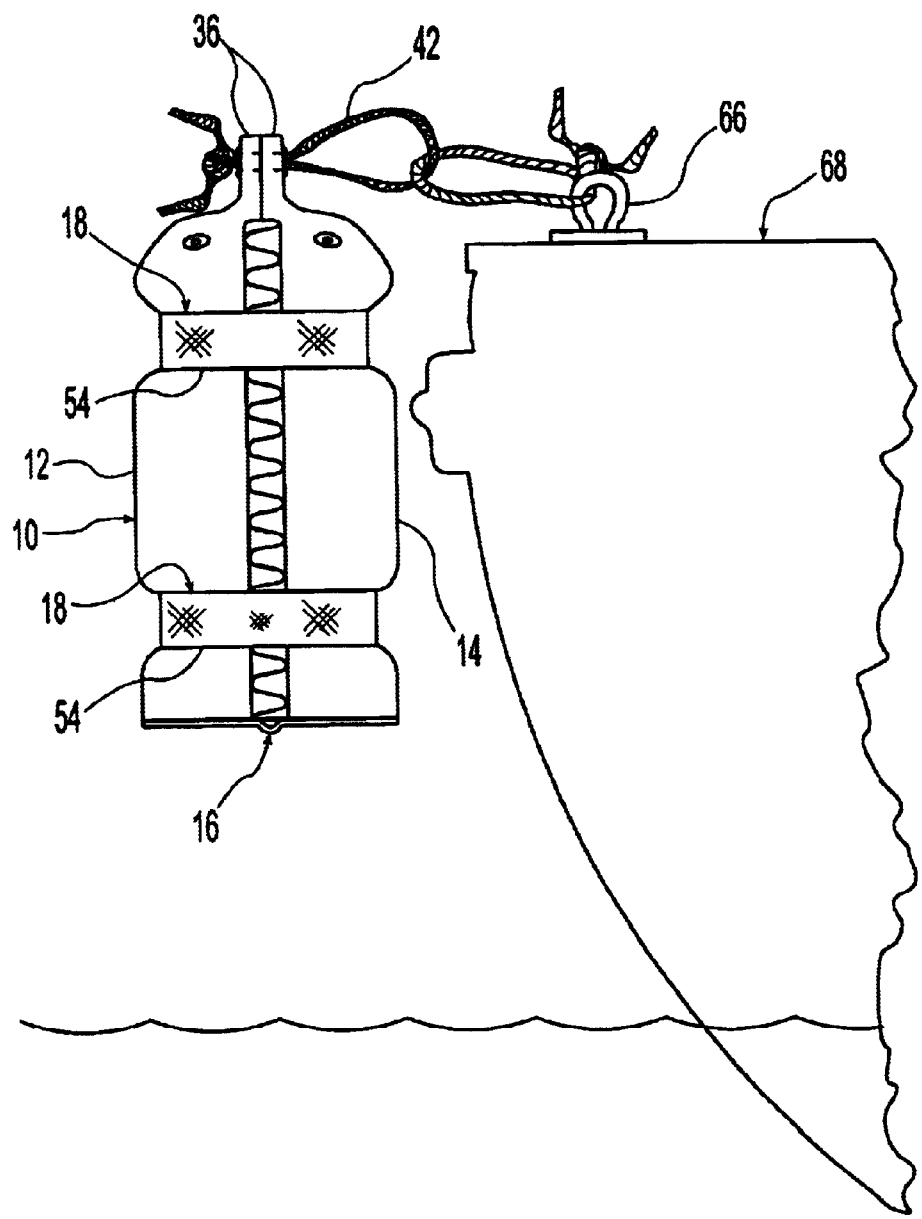
FIG. 8 is a side elevational view of the convertible marine fender of FIGS. 1–5 in the retracted or boat fender configuration and releasably secured to a boat.

As best shown in FIG. 8, the fender 10 can be easily used as a boat fender when in the retracted configuration. In this configuration, the fender 10 is used and behaves the same as a traditional prior art cylindrical-shaped boat fender. The handle 10 can be easily tied to a cleat, railing or other member 66 of a boat 68 so that the fender 10 hangs down along the side of the boat 68 to protect the most laterally projecting portions of the boat 68.

As best shown in FIGS. 4 and 5, the fender 10 can be selectively converted from the retracted configuration to the extended configuration. To make this conversion, the connecting straps 34 are unsecured to release the first body 12 from the second body 14 and the handle 42 is removed from the first body 12. Once the connecting straps 34 and handle 42 are unsecured, the first body 12 is pivoted about the hinge 16 located at the bottom surfaces 24 until the inner surface 22 of the first body 12 is facing the same direction and generally coplanar with the inner surface 22 of the second member 14. The first member 12 is pivoted about the pivot axis 48 for about 180 degrees so that the first body 12 is now oriented upside down with the flange 36 extending downward and the bottom surface 24 of the first member 12 adjacent and facing the bottom surface 24 of the second body 14. In this extended configuration the first and second bodies 12, 14 are located one above the other to generally form a half-cylinder having a length about twice that of the individual lengths of the first and second bodies 12, 14. For example, if the first and second bodies 12, 14 each have a length of about 24 inches so that the cylinder configuration has a length of about 24 inches, the half cylinder configuration has a length of about 48 inches.

Figure 9:
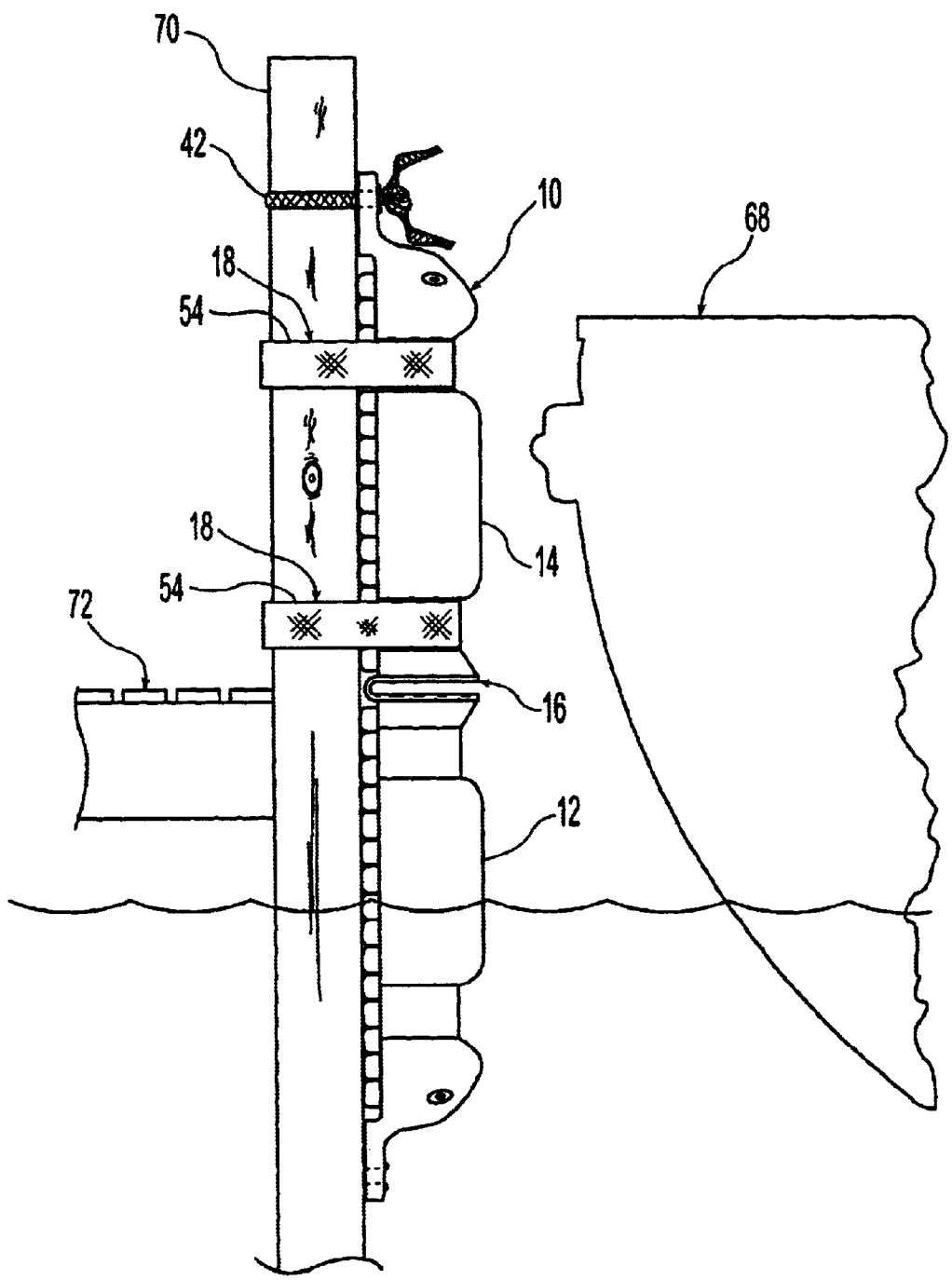
FIG. 9 is a side elevational view of the convertible marine fender of FIGS. 1–5 in the extended or dock fender configuration and releasably secured to a dock.

As best shown in FIG. 9, the fender 10 can be easily used as a dock fender when in the extended configuration. The handle 42 is placed over the top of a dock post 70 of a dock 72. With the inner surfaces 22 of the first and second bodies 12, 14 engaging the dock post 70, the connecting straps 34 are placed around the dock post 70, and secured with the second body 14 tightly engaged against the dock post 70. Secured in this manner, the first and second bodies 12, 14 are secured against the dock post 70 with the second body 14 located above the first body 12. With the fender 10 secured in this manner, the fender 10 protects the most laterally projecting portions of the boat 68 from engaging the dock post 70. The hinge 16 preferably resiliently holds the first body in position against the dock post 70 as it biases the bodies 12,14 toward the retracted configuration. Alternatively, additional connecting straps 34 can be utilized if desired to directly secure the first body 12 to the dock post 70 or a single one of the pair of connecting straps 34 can be utilized for each of the bodies 12, 14.

Figure 10:
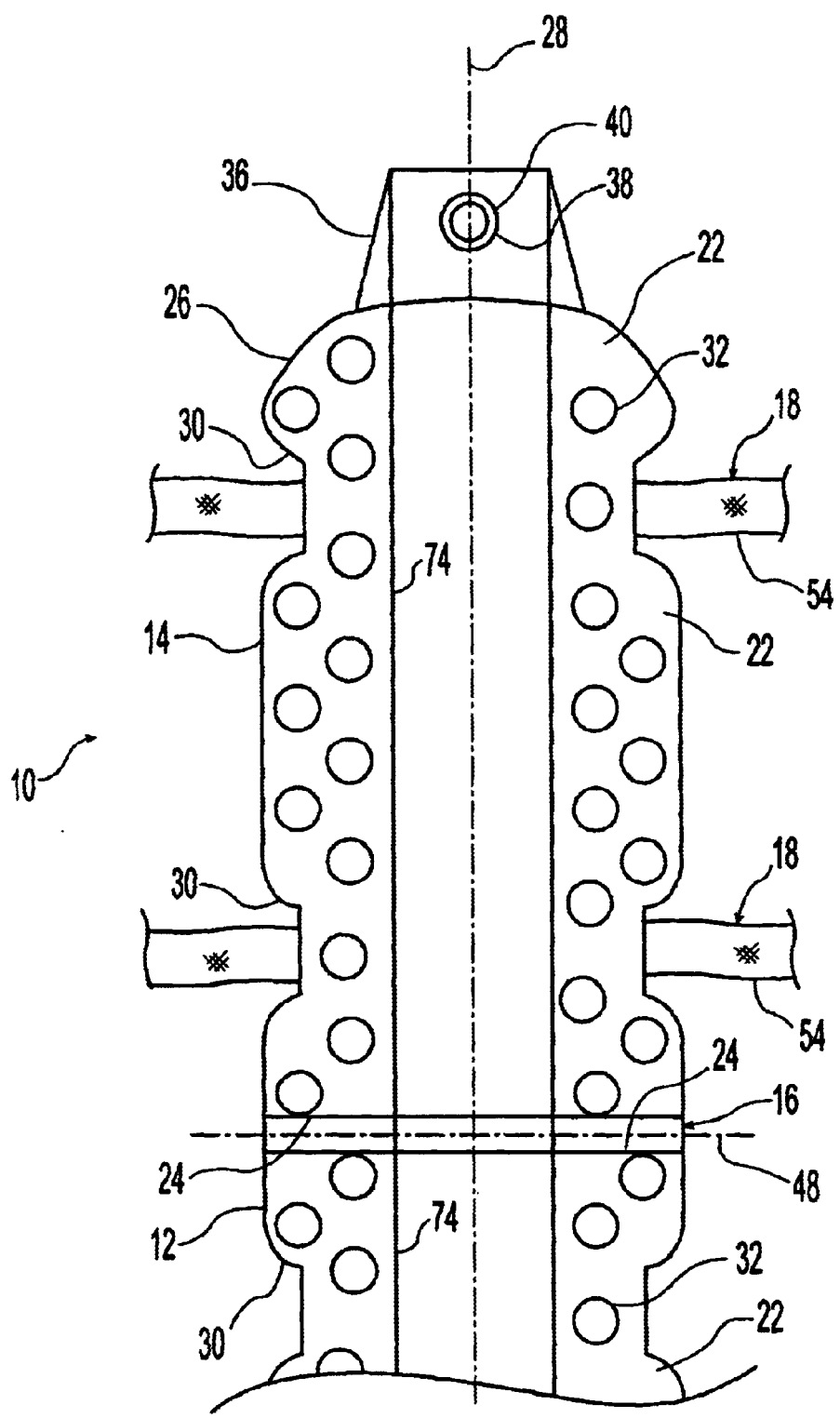
FIG. 10 is a front elevation view of a convertible marine fender according to a variation of the present invention wherein a channel is provided for receiving a dock pole.
Figure 11:
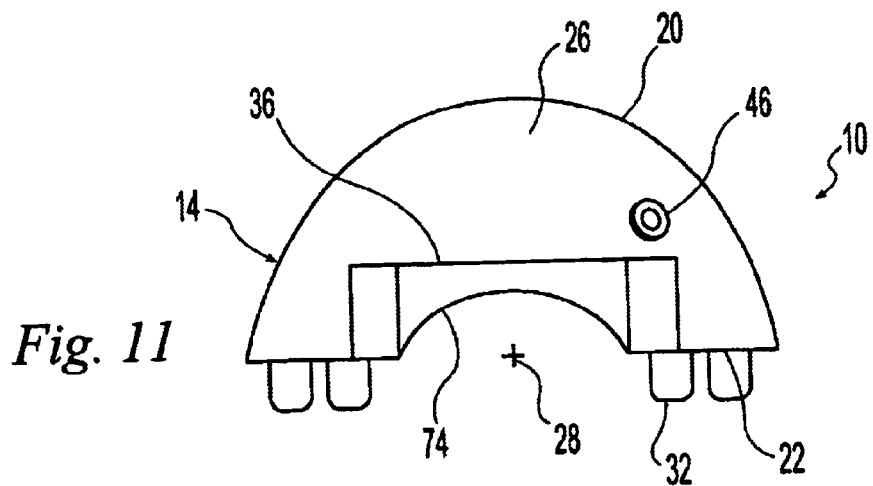
FIG. 11 is a top plan view of the convertible marine fender of FIG. 10.
Figure 12:
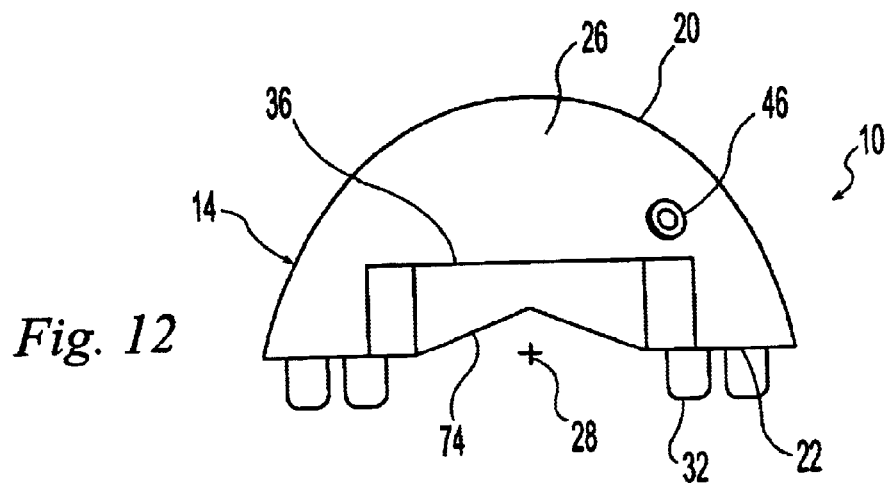
FIG. 12 is a top plan view similar to FIG. 11 but showing another variation wherein the channel is V-shaped.
Figure 13:
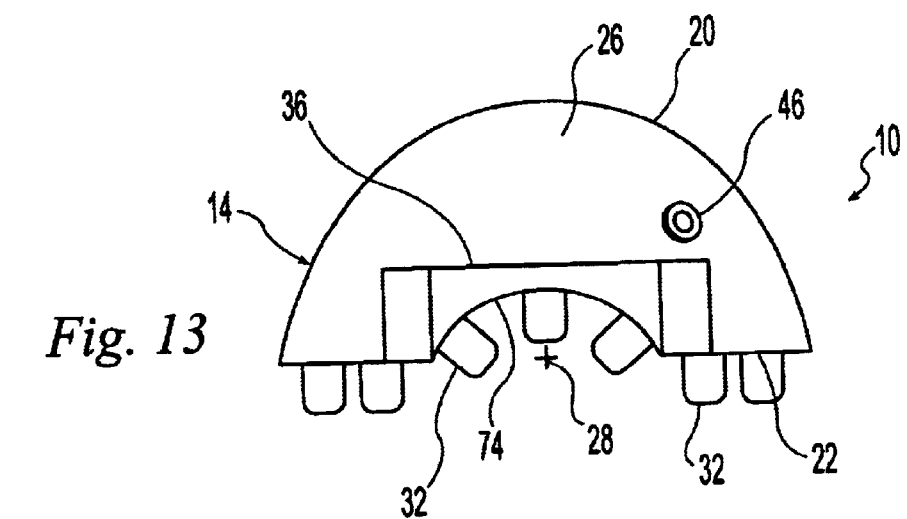
FIG. 13 is a top view similar to FIGS. 11 and 12 but showing yet another variation wherein the channel is provided with non-kid protrusions.
Figure 14:
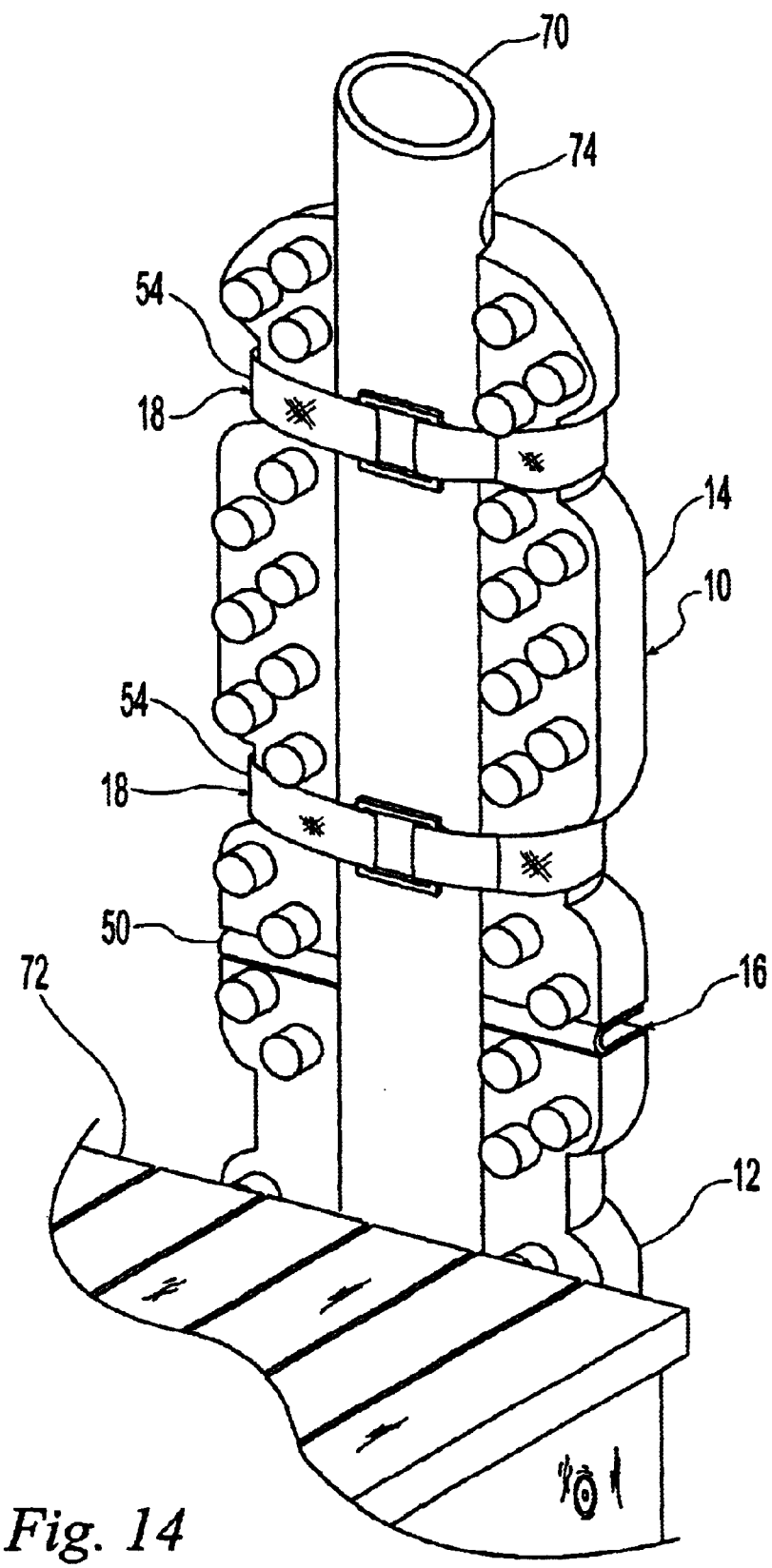
FIG. 14 is a perspective view of the convertible marine fender of FIGS. 10 and 11 in the extended configuration and releasably secured to a dock.

FIGS. 10 and 11 illustrate a variation of the convertible marine fender 10 according to the present invention. The fender 10 is substantially identical to the marine fender described hereinabove except that the fender 10 is provided with a channel 74 for partially receiving the dock post 20 when the fender 10 is in the extended configuration (FIG. 14). The channel 74 is formed in the inner surfaces 22 and longitudinally extends the full length of the first and second bodies 12, 14 at the longitudinal axis 28. The channels 74 of the first and second bodies 12,14 face each other in the retracted configuration and are substantially coaxial in the extended configuration so that each is generally an extension of the other. The planar member 50 is provided with an opening therein so that the channels 74 are continuous in the extended position for passage of the dock post 70. The illustrated channel is arcuate and preferably has a radius sized to easily receive round dock posts 70 partially therein. As shown in FIG. 12, the channel 74 can have other suitable shapes such as, for example, the illustrated V-shaped channel 74. As shown in FIG. 13, the channel 74 can be provided with a plurality of the protrusions 32 like those of the inner surface 22.

It is apparent from the foregoing disclosure that the fender 10 can be easily utilized in two separate manners so that only a single type of fender is needed to be purchased and stored on the boat 68 rather than two different fenders or other types of protection devices. The fender 10 is particularly advantageous for use when the boat 68 is visiting a dock 72 which does not have adequate protection for the boat 68.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the first and second bodies 12, 14 can each have many different shapes and can be formed of many different materials. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A convertible fender comprising, in combination:
   a resilient, elongate first body having a length, a width and a thickness, the length of the first body being greater than the width of the first body and greater than the thickness of the first body;
   wherein the first body has a first longitudinal axis extending in the direction of the length of the first body;
   a resilient, elongate second body having a length, a width and a thickness, the length of the second body being greater than the width of the second body and greater than the thickness of the second body;
   wherein the second body has a second longitudinal axis extending in the direction of the length of the second body;
   a hinge connecting the first and second bodies such that said first body is pivotable lengthwise relative to said second body; and
   wherein the hinge forms a laterally extending pivot axis which is substantially perpendicular to the first longitudinal axis and the second longitudinal axis such that the first body is pivotable lengthwise relative to the second body.

2. The convertible fender according to claim 1, wherein the first and second bodies are each generally half-cylinder-shaped.

3. The convertible fender according to claim 2, further comprising at least one connecting strap extending circumferentially around the first and second bodies and releasably securing the first and second bodies together.

4. The convertible fender according to claim 3, wherein said first and second bodies each have at least one groove formed therein for receiving the at least one connecting strap.

5. The convertible fender according to claim 1, wherein the first body is pivotable lengthwise about said hinge for about 180 degrees relative to said second body.

6. The convertible fender according to claim 1, wherein the hinge includes at least one planar member formed of a flexible material and secured to each of the first and second members.

7. A convertible fender comprising, in combination:
   a resilient, elongate first body having a length, a width and a thickness, the length of the first body being greater than the width of the first body and greater than the thickness of the first body;
   a resilient, elongate second body having a length, a width and a thickness, the length of the second body being greater than the width of the second body and greater than the thickness of the second body;
   a hinge connecting the first and second bodies such that said first body is pivotable lengthwise relative to said second body; and
   wherein the first body has a generally planar first inner surface and the second body has a generally planar second inner surface, and said first body is pivotable about said hinge between a first position wherein the first inner surface is facing and engaging the second inner surface so that the first and second bodies cooperate to form a cylindrical-shape and a second position wherein the first inner surface is facing in the same direction as the second inner surface and generally coplanar with the second inner surface so that the first and second bodies form a half-cylinder-shape.

8. The convertible fender according to claim 7, wherein the first and second bodies are provided with means for interlocking when the first body is in the first position.

9. The convertible fender according to claim 7, wherein the first and second inner surfaces each have a plurality of protrusions extending therefrom and the protrusions of the first and second bodies are adapted to nest together when the first body is in the first position.

10. A convertible fender comprising, in combination:

a resilient first body which is generally half-cylinder shaped having a generally planer first inner surface;

a resilient second body which is generally half-cylinder shaped having a generally planar second inner surface; and a hinge connecting the first and second bodies such that said first body is pivotable between a first position wherein the first inner surface is facing and engaging the second inner surface so that the first and second bodies cooperate to form a cylindrical-shape and a second position wherein the first inner surface is facing in the same direction as the second inner surface and generally coplanar with the second inner surface so that the first and second bodies form a half-cylinder-shape.

11. The convertible fender according to claim 10, wherein the first body pivots lengthwise for about 180 degrees between the first and second positions.

12. The convertible fender according to claim 10, wherein the hinge includes a planar member formed of a flexible material and secured to each of the first and second members.

13. The convertible fender according to claim 10, further comprising at least one connecting strap extending circumferentially around the first and second bodies and relaesably securing the first and second bodies together when the first body is in the first position.

14. The convertible fender according to claim 13, wherein said first and second bodies each have at least one groove formed therein for receiving the at least one connecting strap.

15. The convertible fender according to claim 10, wherein the first and second bodies are provided with means for interlocking when the first body is in the first position.

16. The convertible fender according to claim 10, wherein the first and second inner surfaces each have a plurality of protrusions extending therefrom and the protrusions of the first and second bodies are adapted to nest together when the first body is in the first position.

17. A convertible fender comprising, in combination:

a resilient first body having a generally planer first inner surface with a first channel formed therein;

a resilient second body having a generally planar second inner surface with a second channel formed therein;

a hinge connecting the first and second bodies such that said first body is pivotable between a first position wherein the first inner surface is facing the second inner surface and the first channel is facing the second channel and a second position wherein the first inner surface is facing in the same direction as the second inner surface and the first channel is facing in the same direction as the second channel; and wherein the first channel and the second channel are substantially coaxial when the first and second bodies are in the second position.

18. The convertible fender according to claim 17, wherein the hinge includes a planar member formed of a flexible material and secured to each of the first and second members.

19. A convertible fender comprising, in combination:

a resilient first body having a generally planer first inner surface with a first channel formed therein;

a resilient second body having a generally planar second inner surface with a second channel formed therein;

a hinge connecting the first and second bodies such that said first body is pivotable between a first position wherein the first inner surface is facing the second inner surface and the first channel is facing the second channel and a second position wherein the first inner surface is facing in the same direction as the second inner surface and the first channel is facing in the same direction as the second channel; and wherein the first and second bodies are each generally half-cylinder-shaped and cooperate to form a cylinder in the first position and a half cylinder in the second position.

* * * * *